Oct. 5, 1943.    F. T. POWERS    2,331,225
X-RAY APPARATUS
Filed Oct. 7, 1940    3 Sheets-Sheet 1

INVENTOR
F. T. Powers.
BY
Morgan, Finnegan & Durham
ATTORNEYS

Oct. 5, 1943.   F. T. POWERS   2,331,225
X-RAY APPARATUS
Filed Oct. 7, 1940   3 Sheets-Sheet 3

INVENTOR
F. T. Powers.
BY
Morgan, Finnegan & Durham
ATTORNEYS

Patented Oct. 5, 1943

2,331,225

UNITED STATES PATENT OFFICE 2,331,225

X-RAY APPARATUS

Frank T. Powers, Glen Cove, N. Y.

Application October 7, 1940, Serial No. 359,988
In Great Britain October 9, 1939

14 Claims. (Cl. 250—60)

The present invention relates to new and useful improvements in X-ray apparatus and more particularly to a novel and improved apparatus for producing X-ray photographs.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate modifications of the invention, and together with the description, serve to explain the principles of the invention.

Figure 1:
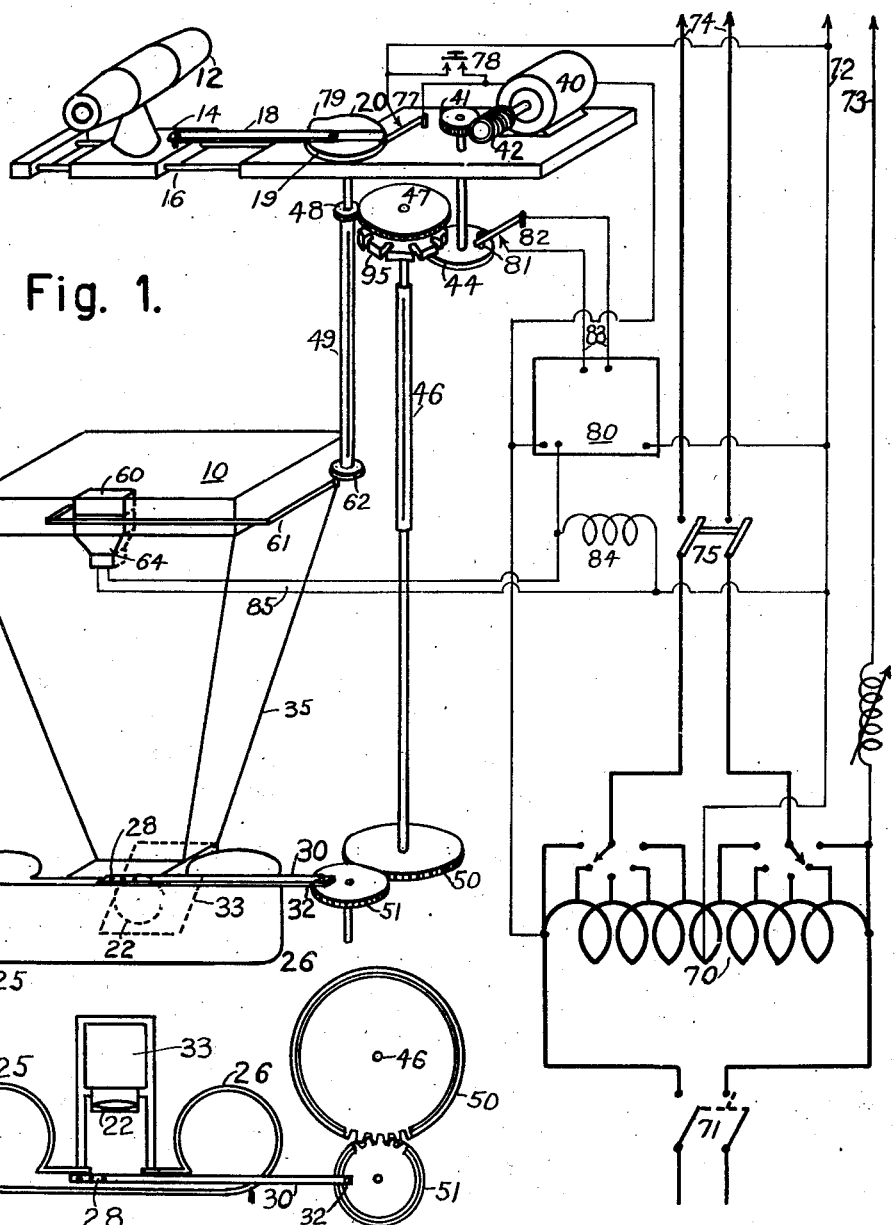
Figure 1 is a schematic view of a typical and illustrative embodiment of the present invention showing the various parts of the apparatus and the circuit connections of the various electrical parts.

The present invention comprises new and useful improvements in the taking of stereoscopic X-ray photographs and more particularly new and improved means for and method of taking photographs in rapid succession, on different areas of photosensitive material of the stereoscopic X-ray images as projected on a fluorescent screen.

The present invention has for an object the provision of an apparatus and method to permit the taking of a large number of stereo X-ray photographs in extremely rapid succession and at a minimum of expense, the successive pictures of each pair of stereo X-ray photographs being taken almost in instantaneous succession, on relatively inexpensive photo-sensitive material and in reduced size, the pairs of images being positioned side by side on the sensitive material so that they can be readily identified in their relation to each other, and at the same time minimizing the handling and positioning required for accurate stereoscopic viewing of the pairs of stereo images.

The invention has for a further object the provision of an improved X-ray apparatus which will permit the taking of stereoscopic X-ray photographs without requiring the movement of relatively large sheets of film, such as are now required in the conventional manner of taking X-ray stereo-photographs. The invention also provides an improved apparatus for taking X-ray stereophotographs in more rapid succession than can now be accomplished by other means thereby producing more accurate photographs as the interval of time between the photographs is shortened. While the invention is of primary importance in connection with pathological examinations it is also of great usefulness in connection with industrial examination of manufactured objects which are opaque to light.

In accordance with the present invention, the subject is placed adjacent to a high intensity fluorescent screen of sufficient area to cover the parts to be examined, as for instance the entire chest region of the patient. The subject is suitably immobilized with respect to the screen, as for instance by means of a tightened fabric strap, and is held in this position closely adjacent to and in contact with the screen support while the active or fluorescent surface of the screen faces the camera during the two stereo exposures.

With the subject in this position, two exposures are made with sufficiently high intensity X-ray tubes to give as bright an image as possible on the fluorescent screen, and these two exposures are made with the X-ray tube or tubes in spaced apart positions so as to introduce the necessary parallax into the screen images. This may be accomplished by using two tubes positioned on the opposite sides of the subject from the screen and at substantially equal distances from the screen and subject, the tubes being spaced about five or six inches apart. Alternatively, a single tube may be employed and the first exposure given with the tube in one such position after which the tube is quickly shifted to the second position for the second exposure both of said positions being substantially equidistant from the fluorescent screen. The plate current supply for the one or two tubes is preferably switched on and off so as to produce exposures of equal intensity and duration, for each of the two positions, and when two tubes are employed the plate current is discontinued from the first tube and almost immediately applied to the second tube. Automatic timing means are preferably provided so as to insure absolute equality of the two exposures, but these timing means preferably provide for a uniform variation in both exposures so that the exposure may be widely varied to suit the subject and the type of work being done.

Means are provided for taking on diffrent areas of photo-sensitive material photographs of the successive X-ray images formed by the X-rays on to the fluorescent screen, and these photographs may be even as small as one fifth or one tenth the linear dimensions of the screen due to the resolving power of the photographic emulsion being greater than that of the screen. That is, the image on the fluorescent screen does not have as fine a definition as the usual photograph, and therefore no details are lost through this reduction in size, and when the images are enlarged all of the original definition of the fluorescent screen image can be viewed.

In accordance with the present invention, a single lens camera may be provided to take photographs upon the successive half widths of a strip of photo-sensitive material which is fed through the camera from one roll to another, sufficient material being provided in the camera to permit a large number of exposures. The lens equipment of such a camera is preferably of relatively large aperture, even as large as f:0.85, but even larger effective apertures may be used when necessary by making use of a spherically concave mirror lens corrected with a Schmidt correcting plate.

When a single lens camera is employed, the related pairs of image areas on the photo-sensitive material may be disposed at right angles to each other, the sensitive material being formed into this shape by suitable guide means, and the image directed first onto one half of the material and then onto the other half by means of a diagonally positioned mirror which is moved into or out of the image path between the exposures. Thus, during the first exposure the image is projected by reflection on to one half of the sensitive material and during the second exposure is projected directly on to the other half of the photo-sensitive material. Similarly, the mirror or a total reflecting prism may be positioned in front of the lens and moved very slightly so as to reflect the image on the fluorescent screen first on to one half-width of the photo-sensitive material and then on to the other half-width during the two exposures, without moving either the screen, lens, or photo-sensitive material.

A single lens and a double width film may also be used by first positioning the lens so that the screen image is properly focussed and centered on one half of the sensitive material and then by shifting the lens to a similar position so as to focus the second image on to the other half of the film, an opaque dividing member being preferably employed between the two halves of the film so as to prevent light leaks from one half of the camera to the other. In a similar way the lens may be held stationary, and the film shifted so as to properly position the two halves for the two separate successive exposures, but in case this system is used the film supply and take-up rolls are also preferably shifted along with the exposure area of the lens.

Where it is desired to have a minimum amount of movement of the lens and film, the camera may be swung about a pivot intermediate the lens and film so as to bring the screen image first onto one half and then the other half of the film. In order to obtain perfect registration of the successive images where the camera is swung, it is also necessary to swing the fluorescent screen so that the screen and film always remain parallel to each other.

A somewhat more costly but more rapid and less complex apparatus for carrying out the present invention comprises a camera having two lenses each of which focus the screen and its fluorescent image on to one of the two halves of the film positioned side by side within the double lens camera, and as the successive exposures are made, the shutters of the two lenses are opened in timed relation with the application of high potential to their respective tubes.

In all instances, the cameras are preferably heavily shielded with lead or other suitable shielding material so as to protect the photo-sensitive material to the greatest possible extent, but where the lens axis and the photo-sensitive material are in the direct path of the X-rays, the lens elements themselves will provide a considerable shielding of the film and it is only necessary to safeguard the film against the X-rays passing around the lens. Where a double lens camera is provided, a total reflecting prism may be used in front of the lenses to permit a better shielding of the film.

When a single lens camera is employed, the lens shutter is first opened during the time the tube is energized in its first position and is closed while the tube is shifted to the second exposure position and during the time that the tube is shifted, the camera, film or mirror is shifted so as to bring the second exposure onto the second half-width of the film. When two tubes are employed, the shutter is similarly opened twice during the two periods of operation of the tubes.

If a double lens camera is employed, the two shutters are opened sequentially in timed relation with the application of high potential to their respective X-ray tubes and this may be accomplished either by the use of separate simultaneously operated switches or by the use of relays actuated by the plate current supply to the tubes.

Where a single lens camera is employed, the selection of the proper area of sensitive film for the exposure is determined by the movement of the mirror, camera, film or lens, as described above, and this movement may be controlled by the shifting movement of the tube from one position to the other, or by the switching of the high potential plate voltage from one tube to the other.

In order to render the apparatus as completely automatic as possible, the motor means for operating the various switches, for shifting the tube from one position to another and for shifting the camera, film, mirror or lens, as the case may be are preferably so interconnected that the operations take place in a definite sequence and at a definite, yet selectively variable, speed, and means are preferably provided for varying the speed to increase the range of subjects which can be properly photographed by the apparatus.

While the invention is particularly adapted for use with roll film having either a transparent base or a paper base, it may also be carried out with cut film or plates where only a few pictures are required in any series. When roll film is employed, the successive stereophotographs are preferably not separated from each other, but are placed in suitable viewing apparatus where they may be accurately and quickly brought to proper viewing position and illuminated by transmitted or reflected light. Such viewing apparatus is preferably so constructed that the accurate positioning of the two related pictures is insured without special manipulation by the observer, so that his attention may be concentrated on the proper interpretation of the stereophotographs.

The present invention reduces the cost of taking stereo-X-ray photographs to a small fraction of the cost of conventional X-ray photographs due to the smaller amount of sensitive material used, and also facilitates the storage of such records by minimizing the amount of space required. Furthermore, due to the automatic nature of the stereophotographic operations, the photographs can be interpreted more reliably as there is less time allowed between exposures and in which the parts of the subject might move, rendering the photographs either indistinct or misleading. By retaining the stereophotographs in roll form there is no possibility of the related photographs becoming separated from each other or associated incorrectly, and the time required for their handling and correct positioning in the viewing apparatus is rendered insignificant.

Figure 2:
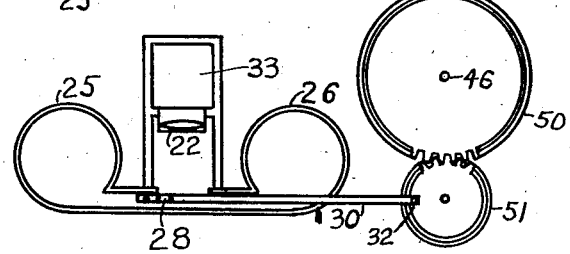
Figure 2 is a top plan view of the lens and film feeding means, shown in Figure 1, the other parts being removed.

Referring now in detail to the typical and illustrative embodiment of the present invention as shown in detail in Figures 1 and 2 of the accompanying drawings, the apparatus comprises a single source of X-radiation which is moved from one point to another for the two stereophotographs and the stereophotographs are recorded on different areas of a strip of film or other photosensitive material. As embodied, and particularly for use in the taking of radiographs of human chests in tuberculosis survey work, there is provided a horizontal fluorescent screen 10 of convenient size having its upper surface opaque to visible light, while the under surface of the fluorescent is transparent or translucent to visible light so that no visible light may be seen through the screen 10, but the fluorescent shadow image is visible or may be photographed from the under side of the screen. Suitable means, not shown, are provided for supporting the person on the screen 10 with their chest or back in direct contact with the screen, as is usual in such work.

The source of X-radiation comprises an X-ray tube 12 or other source of similar radiation supported at a convenient distance, approximately 30 to 50 inches, above the screen 10 and adapted to be moved from one point to another, both of said points being substantially equidistant from the screen and lying in a plane parallel to the screen 10 a short distance corresponding to the desired stereoscopic distance, which may be conveniently from 3 to 5 inches. The X-ray tube 12 is mounted on a platform 14 which is supported and guided by means of the rails 16 and is adapted to be moved by means of the link 18 connected at one end to the platform 14 and at its other end to the variably eccentric pin 19 of disc 20. Pin 19 may be secured along a slot in the disc 20 at the desired radius so that rotation of the disc 20 causes the platform 14 and tube 12 to be shifted the desired distance in a plane parallel to the screen 10. Suitable supporting means, not shown, may be provided for holding the rails 16 and other parts and these are preferably so constructed as to permit the tube to be positioned at different distances from the screen 10.

Means are provided for photographing the shadow image formed by the chest or other body being examined on the fluorescent screen 10 and these means comprise a camera having a lens 22 of relatively large aperture, which need not be provided with shutter if the upper surface of the screen 10 is opaque to visible light, a camera and a support for supporting and guiding the photosensitive film or paper in the correct focal plane of the lens so that the image on the screen 10 is properly focussed on the photo-sensitive material. Means are provided at either side of the exposure area for receiving the strip of photosensitive material so that the unexposed supply of the strip may be positioned in the container 25, led past the exposure position, and be wound up in another container 26. Suitable strip feeding means are provided for feeding the photosensitive strip material past the exposure position after each exposure so as to bring a fresh unexposed area of the material into exposure position and for this purpose a gripper 28 is provided which engages the film as the gripper moves to the right and travels idly over the edge of the strip material as the gripper moves to the left. Means are provided for moving the gripper the correct distance and for this purpose the gripper is connected with a link 30 which is driven by disc 31 through the eccentric pin 32 mounted on the disc.

In order to shield the photo-sensitive material from undesired action of the X-radiation, the film containers 25 and 26 and the upper surface of the camera and film guide between the containers are preferably shielded by a suitable thickness of lead or other shielding material. To facilitate this shielding, and to remove the lens from the deleterious action of the radiation, the lens is preferably mounted with its axis parallel to the screen 10, the shadow image on the screen 10 being reflected into the lens 22 by means of a front-silvered mirror or prism 33 mounted directly in front of the lens and facing the screen 10.

Visible light is excluded from the camera by means of a hood or shield 35 of generally pyramidal form and having opaque, upwardly divergent sides which extend from the lens portion of the camera to the edges of the screen 10, thereby allowing no light to enter the camera or act on the photo-sensitive material except the light of the fluorescent shadow image on the screen 10 as focussed by the lens 22.

The X-ray tube shifting means and the means for advancing the photo-sensitive strip material are preferably interconnected mechanically so that the strip material is advanced while the X-ray tube is concurrently shifted, after which the X-ray tube and photo-sensitive material remain stationary so that the X-ray tube may be energized and the photo-sensitive material may be exposed. As embodied, a motor 40 drives worm gear 41 through worm 42 to drive the Geneva gearing comprising the driving pin disc 44 and the star wheel 45. Star wheel 45 is rotatably mounted by means of shaft 46 and is fast to gear 47 which meshes with pinion 48 so that pinion 48 is driven one-half revolution each half-revolution of disc 44. Pinion 48 is drivingly connected to the telescopic shaft 49 and disc 20 so that during each complete revolution of the disc 44, X-ray tube 12 is held stationary in its extreme left position for almost one half-revolution of the disc 44, is then quickly moved to the extreme right-hand position, is again held stationary for almost one-half revolution of the disc 44 and is finally returned to its extreme left position, ready for the next cycle of operation, the periods during which the tube is held stationary being of sufficient duration for the required time of radiation.

Shaft 46 extends downwardly and at its lower end carries gear 50 which meshes with gear 51 fast to the pin carrying disc 31 of the advancing means for the photo-sensitive material, and the gear ratio and eccentricity of pin 32 are such that the strip of photo-sensitive material is advanced the correct distance during the movement of the tube 12.

Means are also provided for recording a serial number or other indicia on the photo-sensitive material so that the various photographs may be identified and properly paired. Preferably, the photographs of each pair are similarly identified, and for this purpose an illuminated counter 60 is provided which is included in the field of view of the camera and near one edge thereof, this counter being actuated after every second exposure by means of the linkage 61 driven from the disc 62 at the lower end of shaft 49 which is rotated one half-revolution every exposure. Suitable illuminating means are provided for lighting the counter so that it may be photographed and comprise a lamp within the housing 64 shining on the numbered portion of the counter and shielded so that its direct rays do not fall on the lens 22.

The various mechanical and electrical parts of the apparatus are interconnected for automatic operation and auto-transformer 70 is supplied with current from the main switch 71 which has various voltage taps so that the X-ray tube filament may be supplied with power through the conductors 72 and 73 and the high-voltage current for the X-ray tube may be supplied from conductors 74 through switch 75 feeding the primary of a conventional high-tension X-ray transformer (not shown) which has its secondary connected to the X-ray tube 12.

The motor 40 is supplied with current from the conductor 76 and from conductor 72 through the switch 77 or starting push button 78, connected in parallel, switch 77 being moved to circuit opening position by means of the raised portion 79 of disc 20 as the X-ray tube 12 is moved to its extreme left position, thereby causing the motor 40 to continue in operation after a momentary closure of the starting push button 78 until the disc 20 has made a full revolution corresponding to a pair of X-ray stereophotographs.

For timing the various X-ray exposures, a conventional X-ray timer 80 is provided which is connected to close the X-ray plate supply circuit for a predetermined, but variable time for each exposure. As embodied, the disc 44 has two Geneva pins 81 each of which is adapted to momentarily close the switch 82 as soon as the X-ray tube has been brought to rest. Switch 82 closes the timer circuit 83 supplying current to the solenoid 84 which moves switch 75 to closed position and holds it closed for the predetermined time, and at the same time supplies current through the conductors 85 to illuminate the indicia 60.

The operation of the above-described embodiment may be summarized as follows:

Switch 71 is closed and the transformer 70 is adjusted to supply current at the proper voltage to the filament and plate of the X-ray tube 12. The subject to be examined is then positioned over and in close proximity to the screen 10, after which the push button 78 is closed. The motor 40 starts rotating disc 44, pin 81 closes switch 82, thereby starting the timer 80 to energize solenoid 84 to close switch 75 and give the predetermined required exposure. The current supplied to the X-ray tube causes a shadow image of the subject to be formed on the screen 10, the lamp 64 illuminates the indicia 60, and the photo-sensitive material receives an exposure through the lens 22. The timer shuts off the X-ray current after one-tenth of a second or other predetermined period, disc 44 continues to rotate and turns geneva 45, rotating disc 20 to shift the X-ray tube 12 to its right hand position, and with the tube in this position the other pin 81 on disc 44 again momentarily closes the switch 82 to start the timer which again closes switch 75 through solenoid 84 for the second stereo-exposure. During this movement of the disc 44, the strip of photo-sensitive material was fed a distance sufficient to bring an unexposed area into exposure position with reference to the lens 22 and the strip has been brought to rest by the time the second exposure starts. The second exposure is of a similar time, and after this has been completed, further rotation of the disc 44 causes disc 20 to shift the tube 12 back to its left hand position, disc 62 advanced the counter 60 to the next indicia, the strip of photo-sensitive material is again advanced and the lobe 79 on disc 20 opens switch 77 to interrupt the current supply to motor 40 causing the apparatus to come to rest, ready for the next subject.

Figure 3:
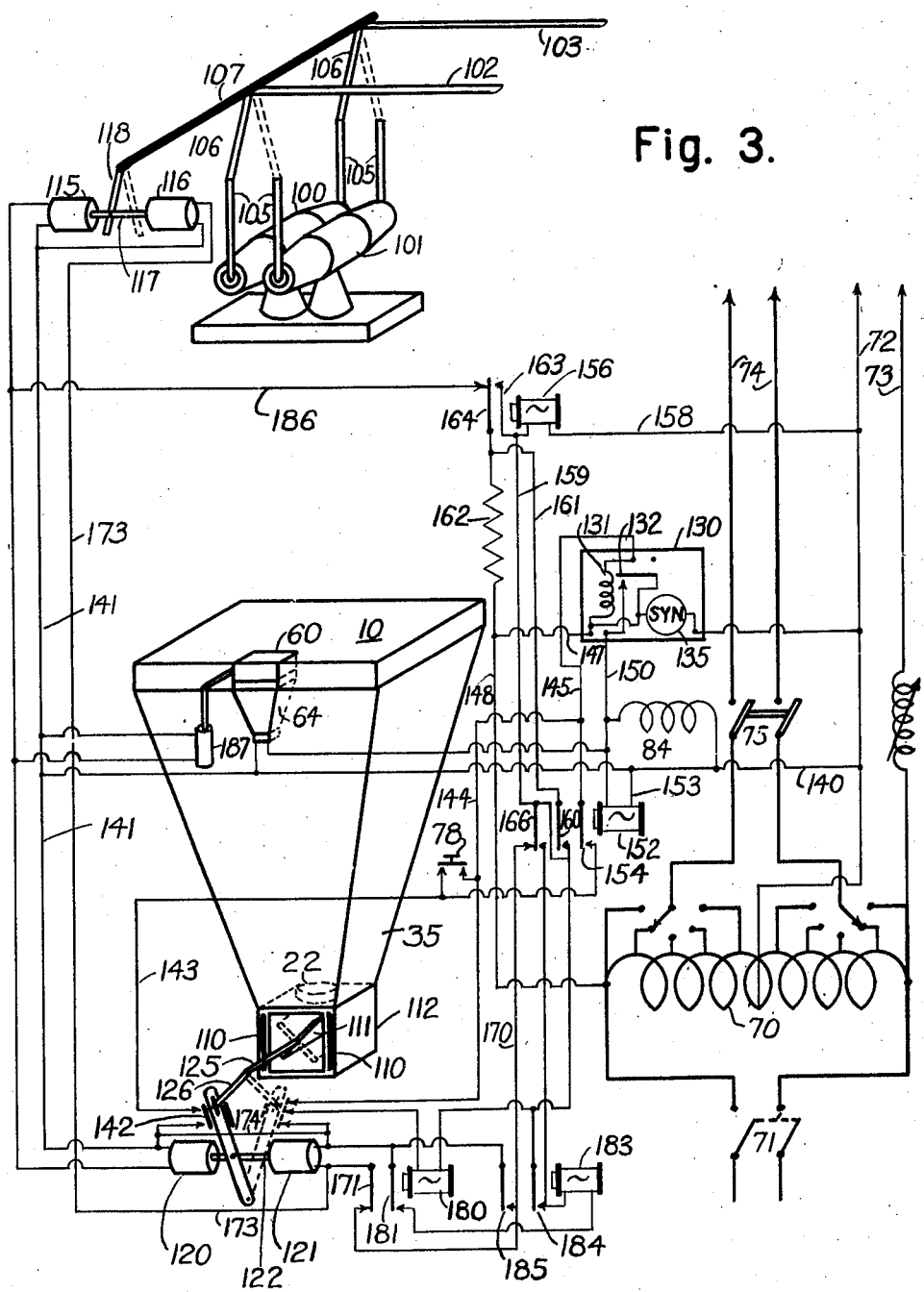
Figure 3 is a similar schematic view of a modified embodiment of the present invention, certain of the circuit connections being omitted.

Referring now to Figure 3 of the drawings, there is shown an embodiment of the invention where the source of spaced apart X-radiation comprises a pair of X-ray tubes 100 and 101, supplied with current in the plate circuit from secondary leads 102 and 103 which may be connected to the high-tension terminals 105 by means of the switch members 106 which are interconnected by insulating bar 107 for simultaneous movement, so that with the filaments of both tubes heated, the X-radiation may be instantaneously shifted from one tube to the other.

The fluorescent screen 10, with the illuminated indicia 60, is provided, as in Figure 1, suitably positioned for the formation of the stereoscopic X-ray shadow images as the X-radiation is shifted from one tube to the other. Beneath the screen 10 is a camera having a lens 22 focussing the shadow images of the screen 10 on one or the other of the cut-film holders 110, dependent upon the position of the mirror 111 which can be shifted 90° between exposures so as to photograph the successive stereoscopic images on different areas of film or other photo-sensitive material. The camera is shielded by means of the pyramidal box sides 35 and the sides 112 of the camera proper.

Electromagnetic means are provided for shifting the high-tension power supply from one tube 100 to the other tube 101, and for simultaneously shifting the mirror 111 from one diagonal position to its other. As embodied, a pair of solenoids 115, 116 are provided with armatures connected to a bar 117 between them, and this bar is connected to shift the switching bar 107 by means of the arm 118 so that with the left solenoid 115 energized, the left tube 105 is supplied with high-tension current through the switch members 106, and as the solenoid 116 is energized, high-tension current is similarly supplied to the tube 101. Adjacent the camera, are provided a pair of solenoids 120, 121, the armatures of which are interconnected by a bar 122 pivoted to arm 123 which is mounted to shift the mirror 111 by turning the mirror shaft 125 through its arm 126. Energization of solenoid 120 reflects the screen image to the left onto the film in holder 110, and energization of solenoid 121 shifts the mirror 111 to reflect the image onto the film in the right film holder 110.

As in the previously described embodiment, the X-ray tube is supplied with filament current through the leads 72 and 73, the high-tension current for the X-ray plate voltage is supplied from a transformer fed from the leads 74 when switch 75 is closed by energization of the solenoid 84 and all of the electrical parts of the apparatus are supplied with current at the proper voltage from the multiple-tapped auto-transformer 70 which receives current through the main switch 71.

The duration of the X-radiation from either tube 100 or 101 is determined by the timer 130, which conventionally includes a clutch winding 131, a switch 132 and a timing motor 133 arranged to close the switch 132 for a predetermined time after power is initially applied to the winding 131.

The various other circuit connections will be described in connection with the operation of this embodiment. At the beginning of each pair of stereophotographs the switching members 106 and the mirror 111 are in the position shown in the drawings so that the initial X-radiation is from the left tube 105 and is photographed on the left film in holder 110.

The apparatus is set in operation by closing the push button 78 and current is supplied from common conductor 140, connected to the auto-transformer, through lead 141 through switch 142, conductor 143, push button 78, conductors 144, 145, clutch winding 131, and conductors 147 and 148 connected to the other side of the auto-transformer. Closure of the circuit for the clutch winding 131 causes clock 135 to close switch 132 and then current is applied from conductor 147 through switch 132 to the conductor 150, relay winding 152, conductor 153 and then to the autotransformer through common conductor 140. Push button 78 may be released instantaneously as the circuit is then held closed by relay 152 through the relay contacts 154 in parallel with push button 78.

The closure of the timing switch energizes switching solenoid 84 to close switch 75 which remains closed for the predetermined time, such as a period of one-tenth second. Relay 156 is also closed by the timer 130 and receives current through conductor 158, switch 160, conductor 161, resistance 162 and lead 148 which is connected to the outer side of transformer 70. Closure of relay 156 holds the relay closed through contact 163 and armature 164 which connects the relay winding directly to the resistance 162.

Timer 130 now opens switch 132 deenergizing solenoid 84 to open switch 75 and also deenergizing relay 152 and allowing the third movable contact 166 of this relay to move to the left and current is supplied from the side of transformer 70 through conductor 148, resistance 162, relay contacts 164, 163, conductors 159, relay contacts 166, conductor 170, normally closed relay contacts 171, and through solenoid 121 to the conductor 174 which is connected to conductor 141 and common conductor 140, and also through conductor 173 to the solenoid 116 to conductors 141 and 140, thereby energizing the solenoids 116 and 121 to shift mirror 111 to the right and to shift high-tension switch 106 to the right hand tube 101.

Shifting of the mirror 111 to the right is accompanied by a shifting of the switch 142 to close the right hand contacts thereby supplying current from common conductor 140 through 141, 174 and to the conductor 144 which causes the clutch winding 131 to be energized closing switch 132, again energizing solenoid 84 to close switch 75 and operating relay 152. The shift of the mirror and switch 142 is also accompanied by the operation of relay 180 to open contact 171 and close contact 181 thereby interrupting the supply of power to the solenoids 121 and 116, while the closing of contacts 181 operates relay 183 thereby closing contacts 184 and 185, contacts 184 serving to hold the relay 183 energized until timer 130 opens switch 132, thus deenergizing switch 183 and relay 152. The opening of switch 132 also releases the switch 75 to interrupt the high-tension power supply to tube 101.

Each time that the switch 75 closes, the lamp 64 for the indicia is lighted thereby enabling the film to be identified by the proper indicia.

As relay 152 opens, contacts 166 close the short circuit for relay winding 156 shunting the winding through conductor 159, contact 166, conductor 170, contacts 185 to the common conductor 141, 140. The deenergization of winding 156 allows contact 164 to return to its normal position in closed position with reference to conductor 186 to energize coils 115 and 120 to return the switch 106 to the left position, and to return the mirror 111 to the full line position. At the same time solenoid 187 is energized to advance the indicia to the next higher number fully completing the cycle and preparing the apparatus for the next pair of operations.

Thus, the left tube 100 is initially energized and the corresponding shadow image on the screen 10 is photographed on the left film in its holder 110. Immediately that the exposure has been completed, the high-tension current is applied to the right hand tube 101, the mirror 111 is shifted to the right, the high-tension current is again supplied but to the tube 101, and the corresponding shadow image is photographed onto the film in the right hand holder 110. The apparatus is then restored to its original position, ready to be again set in operation by pushing the starting button 78, and the film holders 110 may be replaced by others containing unexposed film.

Figure 4:
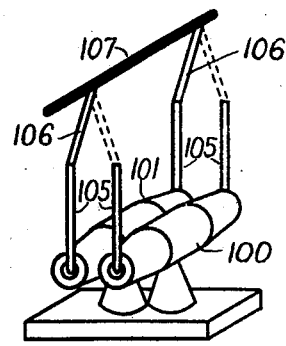
Figure 4 is a schematic view of a further modification of the present invention with certain of the circuit connections being omitted.
Figure 4:
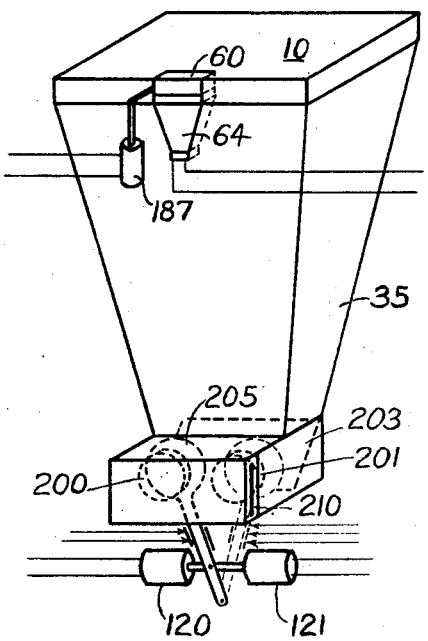

Figure 4 of the drawings illustrates a further modification of the invention in which the successive stereoscopic images of the subject are photographed on different areas of photosensitive material through different lenses in the camera. The various electrical connections of this modification may be the same as in the embodiment of Figure 3 and are omitted from the drawings for the sake of clarity.

The successive stereoscopic shadow images on the screen 10 are photographed on different areas of photosensitive material by means of the lenses 200 and 201 into which the images are reflected by means of the mirror 203. A shutter 205 is pivotally mounted to obstruct one lens and then the other, and as illustrated the photograph is taken first on the right hand area of photosensitive material while the tube 100 is energized, and thereafter it is taken on the left hand area while the tube 101 is energized.

In this embodiment, the solenoids 120 and 121 are connected to shift the shutter 205 after each exposure, and after the pair of photographs have been taken a new sheet of film may be inserted by replacing the film holder 210, or automatic feeding means may be provided, as in Figure 1.

The invention in its broader aspects is not limited to the specific mechanisms shown and described but departures may be made therefrom within the scope of the accompanying claims without departing from the principles of the invention and without sacrificing its chief advantages.

What I claim is:

1. Stereographic X-ray apparatus including in combination a plurality of successively operating, spaced-apart sources of X-radiation, a fluorescent screen activated by the radiation, for producing visible successive X-ray shadow images of one and the same object positioned adjacent said screen, means for supporting photosensitive material, means for forming a photographic image of the X-ray shadow on the photosensitive material and means for relatively moving the photographic image and the photosensitive material to photograph the successive X-ray shadow images of said object on the different areas of the photosensitive material to provide a pair of stereophotographs of the images of said object.

2. Stereographic X-ray apparatus including in combination a plurality of successively operating, spaced-apart sources of X-radiation, a fluorescent screen activated by the radiation, for producing visible successive X-ray shadow images of one and the same object positioned adjacent said screen, means for supporting photosensitive material, a plurality of lenses to form images of the X-ray shadow image of said object on different areas of photosensitive material, and means for successively exposing said different areas through said lenses between the operations of said sources of X-radiation to provide a pair of stereophotographs of the images of said object.

3. Stereographic X-ray apparatus including in combination a plurality of successively operating, spaced-apart sources of X-radiation, a fluorescent screen activated by the radiation, for producing visible successive X-ray shadow images of one and the same object positioned adjacent said screen, means for supporting photosensitive material, a lens to form an image of the X-ray shadow image of said object on different areas of photosensitive material and means for relatively shifting the image and photosensitive material between the successive operations of the spaced apart sources of X-radiation to provide a pair of stereophotographs of the images of said object.

4. Stereographic X-ray apparatus including in combination means for successively producing X-radiation from spaced points, a fluorescent screen activated by the radiation, for producing visible successive X-ray shadow images of one and the same object positioned adjacent said screen, means for supporting photosensitive material, means for forming a photographic image of the X-ray shadow of said object on the photosensitive material and means for relatively moving the photoghaphic image and the photosensitive material to photograph the successive X-ray shadow images on different areas of the photosensitive material to provide a pair of stereophotographs of the images of said object.

5. Stereographic X-ray apparatus including in combination means for successively producing X-radiation from spaced points, a fluorescent screen activated by the radiation, for producing visible successive X-ray shadow images of one and the same object positioned adjacent said screen, means for supporting photosensitive material, a plurality of lenses to form images of the X-ray shadow image of said object on different areas of photosensitive material, and means for successively exposing said different areas through said lenses between the operation of said X-radiating means to provide a pair of stereophotographs of the images of said object.

6. Stereographic X-ray apparatus including in combination means for successively producing X-radiation from spaced points, a fluorescent screen activated by the radiation, for producing visible successive X-ray shadow images of one and the same object positioned adjacent said screen, means for supporting photosensitive material, a lens to form an image of the X-ray shadow image of said object on different areas of photosensitive material and means for relatively shifting the image and photosensitive material between the successive operations of the X-radiation producing means at said spaced points to provide a pair of stereophotographs of the images of said object.

7. Stereographic X-ray apparatus including in combination a source of X-radiation, a fluorescent screen activated by the radiation for producing visible successive X-ray shadow images of one and the same object positioned adjacent said screen, means for shifting said source from one point to another, both of said points being substantially equidistant from the screen, means for supporting photosensitive material, means for forming a photographic image of the X-ray shadow of said object on the photosensitive material, and means for relatively moving the photographic image and the photosensitive material to photograph the successive X-ray shadow images on different area of the photosensitive material to provide a pair of stereophotographs of the images of said object.

8. Stereographic X-ray apparatus including in combination a source of X-radiation, a fluorescent screen activated by the radiation for producing visible successixe X-ray shadow images of one and the same object positioned adjacent said screen, means for shifting said source from one point to another, both of said points being substantially equidistant from the screen, means for supporting photosensitive material, a lens to form an image of the X-ray shadow image of said object on different areas of photosensitive material and means for relatively shifting the image and photosensitive material between the successive operations of the source of X-radiation to provide a pair of stereophotographs of the images of said object.

9. Stereographic X-ray apparatus including in combination a pair of spaced apart sources of X-radiation, a screen activated by the X-radiation from said sources for producing visible successive X-ray shadow images of one and the same object positioned adjacent said screen, a lens, photosensitive material to receive the image of the shadow image of said object on the screen as focussed by the lens, means for controlling the time of X-radiation from each source, and means for shifting the photosensitive material after each exposure to provide a pair of stereophotographs of the images of said object.

10. Stereographic X-ray apparatus including in combination means for producing X-radiation at a plurality of spaced apart points, a fluorescent screen to be activated by the X-radiation for producing visible successive X-ray shadow images of one and the same object positioned adjacent said screen, means for taking successive photograhs of the shadow images of said object on the screen on different areas of photosensitive material, means for successively timing the X-radiation from each of said points and means for shifting the photosensitive material after each exposure to provide a pair of stereophotographs of the images of said object.

11. Stereographic X-ray apparatus including in combination means for producing X-radiation at a plurality of spaced apart points, a fluorescent screen to be activated by the X-radiation, for producing visible successive X-ray shadow images of one and the same object positioned adjacent said screen, means for taking successive photographs of the shadow images of said object on the screen on different areas of photosensitive material, means for successively timing the X-radiation from each of said points, means for shifting the photosensitive material after each exposure, means for manually initiating the X-radiation, means for alternately actuating the X-radiation timing means and shifting means, and means for automatically stopping the apparatus after a pair of photographs have been taken by X-radiation from the spaced apart points to provide a pair of stereophotographs of the images of said object.

12. Stereographic X-ray apparatus including in combination means for producing X-radiation from a plurality of spaced-apart points, a fluorescent screen for producing visible successive X-ray shadow images of one and the same object positioned adjacent said screen, means for taking successive photographs of the shadow images of said object on the screen on different areas of photosensitive material, means for timing the X-radiation at each of said points and means for relatively moving the shadow images and photosensitive material between the periods of X-radiation to provide a pair of stereophotographs of the images of said object.

13. Stereographic X-ray apparatus including in combination means for producing X-radiation from a plurality of spaced-apart points, a fluorescent screen for producing visible successive X-ray shadow images of one and the same object positioned adjacent said screen, means for taking successive photographs of the shadow images of said object on the screen on different areas of photosensitive material, and means for timing the X-radiaiton at each of said points to provide a pair of stereophotographs of the images of said object.

14. Stereographic X-ray apparatus including in combination means for successively producing X-radiation from spaced points, a fluorescent screen activated by the radiation for producing visible successive X-ray shadow images of one and the same object positioned adjacent said screen, means for supporting a plurality of exposure areas of photosensitive material, and camera means for photographing successive X-ray shadow images of said object upon different areas of the photosensitive material to provide a pair of stereophotographs of said object.

FRANK T. POWERS.